(12) United States Patent
Shumway (10) Patent No.: US 7,214,315 B2
(45) Date of Patent: *May 8, 2007

(54) PRESSURE EXCHANGE APPARATUS WITH INTEGRAL PUMP

(76) Inventor: Scott Shumway, 764 Leavensworth Rd., Hinesburg, VT (US) 05461

(*) Notice: Subject to any disclaimer, the term of this patent is extended or adjusted under 35 U.S.C. 154(b) by 315 days.

This patent is subject to a terminal disclaimer.

(21) Appl. No.: 10/922,284

(22) Filed: Aug. 20, 2004

(65) Prior Publication Data

US 2006/0037895 A1    Feb. 23, 2006

(51) Int. Cl.
B01D 61/06    (2006.01)
B01D 63/00    (2006.01)

(52) U.S. Cl. .................. 210/321.66; 210/321.65; 210/416.1; 210/137; 417/64; 417/269; 417/393

(58) Field of Classification Search .............. None
See application file for complete search history.

(56) References Cited

U.S. PATENT DOCUMENTS

| | | | | |
|---|---|---|---|---|
| 4,468,176 A | * | 8/1984 | Munch | 417/406 |
| 4,471,795 A | * | 9/1984 | Linhardt | 137/14 |
| 4,973,402 A | * | 11/1990 | Johnson et al. | 210/136 |
| 5,049,045 A | * | 9/1991 | Oklejas et al. | 417/365 |
| 6,537,035 B2 | * | 3/2003 | Shumway | 417/64 |
| 6,773,226 B2 | * | 8/2004 | Al-Hawaj | 415/116 |

* cited by examiner

Primary Examiner—Krishnan S. Menon
(74) Attorney, Agent, or Firm—Eric C. Spencer (57) ABSTRACT

A pressure exchange device is provided that utilizes an integral high pressure boost pump that is in fluid communication with a pressure exchange unit. An optional low pressure boost pump unit may also be provided. The pressure exchange unit comprises a rotating rotor assembly inside a housing to transfer the pressure of a fluid from one high pressure fluid to another low pressure fluid.

15 Claims, 4 Drawing Sheets

PRESSURE EXCHANGE APPARATUS WITH INTEGRAL PUMP

BACKGROUND OF THE INVENTION

This invention relates to pressure exchangers for transfer of energy from one liquid flow to another. More specifically, this invention relates to pressure exchangers having an integral pump for the transfer of energy from one liquid stream to another.

The present invention provides a device that can be appropriately described as an engine for exchanging pressure energy between relatively high and relatively low pressure fluid systems, which the term fluid being defined here as including gases, liquids and pumpable mixtures of liquids and solids. The engine for pressure energy exchange of the present invention is a highly efficient device with well over 90% of the energy of pressurization in a pressurized fluid system being transferred to a fluid system at a lower pressure. The device employed for achieving this highly efficient transfer has a long and trouble free operating life which is not interrupted by the plugging and fouling of valves, or the binding or freezing of sliding pistons or the like.

In accordance with the prior art, a typical application of such a pressure exchange apparatus required the use of externally fitted boost pumps to assist the flow of the fluid through the process. This approach would require the use of two separate motors, additional plumbing fittings and often separate power supplies. The present invention provides a device that provides both the pressure exchange function and the boost pump function in a single, efficient package. This approach reduces the need for separate motors, reduces the plumbing requirements and power supply requirements. In this fashion, a system employing the present invention will be less expensive to set up, more reliable and less costly to maintain.

In some industrial processes, elevated pressures are required only in certain parts of the operation to achieve the desired results, following which the pressurized fluid is depressurized. In other processes, some fluids used in the process are available at high pressures and others at low pressures, and it is desirable to exchange pressure energy between these two fluids. As a result, in some applications, great improvement in economy can be realized if pressure exchange can be efficiently transferred between the two fluids.

By way of example, a pressure exchange engine finds application in the production of potable water using the reverse osmosis membrane process. In this process, a feed saline solution is pumped into a membrane array at high pressure. The input saline solution is then divided by the membrane array into super saline solution (brine) at high pressure and potable water at low pressure. While the high pressure brine is no longer useful in this process as a fluid, the pressure energy that it contains has high value. A pressure exchange engine is employed to recover the pressure energy in the brine and transfer it to feed saline solution. After transfer of the pressure energy in the brine flow, the brine is expelled at low pressure to drain.

Accordingly, pressure exchangers of varying design are well known in the art. U.S. Pat. No. 3,431,747 to Hashemi et al. teaches a pressure exchanger for transfer of pressure energy from a liquid flow of one liquid system to a liquid flow of another liquid system. This pressure exchanger comprises a housing with an inlet and outlet duct for each liquid flow, and a cylindrical rotor arranged in the housing and adapted to rotate about its longitudinal axis. The cylindrical rotor is provided with a number of passages or bores extending parallel to the longitudinal axis and having an opening at each end. In accordance with the prior art, a boost pump is employed to reintroduce pressure exchanged fluid into the filtration system. As mentioned previously, this boost pump is a stand alone device employing a separate motor and additional plumbing.

Figure 3:
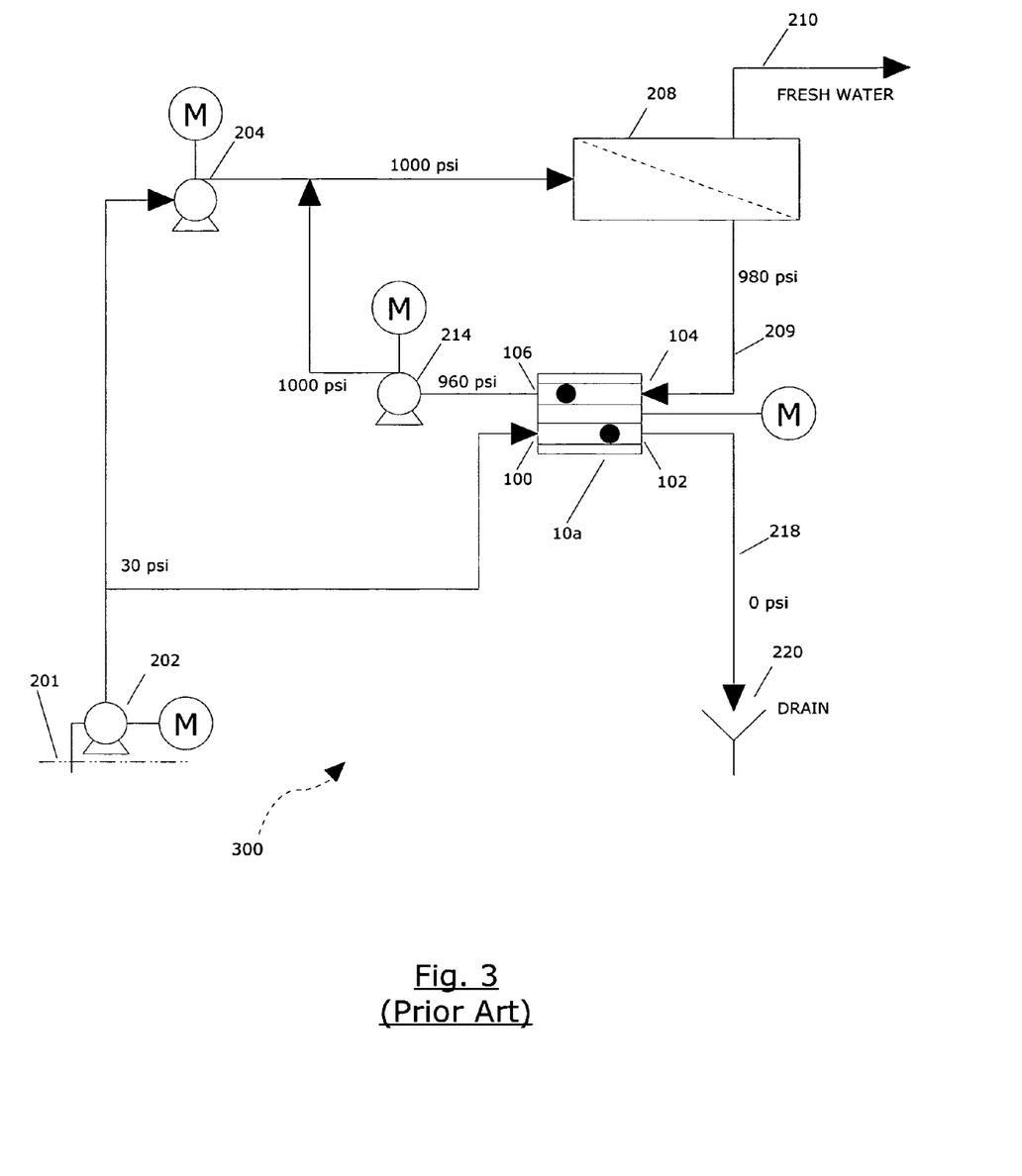
FIG. 3 is a block diagram view of a filtration system in accordance with the prior art.

Describing this filtration system in more detail, refer to FIG. 3 which shows a filtration system in accordance with the prior art. A salt water filtration system 300 is shown that uses a reverse osmosis process for the production of potable water which comprises a pressure exchange device 10a in accordance with the prior art.

An unfiltered salt water reservoir 201 provides a supply of unfiltered salt water which is pumped to a high pressure pump 204 by reservoir pump 202. Typically the reservoir pump 202 supplies unfiltered salt water to both the high pressure pump 202 and the pressure exchange device 10a at approximately 30 psi pressure at approximately equal flow rates. The high pressure pump 204 boosts the pressure to approximately 1000 psi and supplies the unfiltered salt water to a filter element 208. In this particular application, and not by way of limitation, the filter element 208 comprises a reverse osmosis type filter device which removes the impurities from the water and provides a fresh water supply 210. A pressure drop occurs in the filter element 208 such that a supply of waste water 209 exits the filter element 208 at approximately 980 psi. Rather than dump this waste water 209 at this elevated pressure, the waste water 209 is supplied to a high pressure inlet 104 of the pressure exchange device 10a. This high pressure waste water is thus used to pressurize additional unfiltered salt water for use in the filtration process. Reuse of the pressure energy contained in the high pressure waste water 209 thus provides for a highly efficient filtration system 200.

As mentioned previously, the reservoir pump 202 supplies unfiltered salt water to a low pressure inlet 100 of the pressure exchange device 10a. The pressure exchange device 10a is configured to raise the pressure of the unfiltered salt water supplied to it by the reservoir pump 202 to a pressure equal to the pressure of the waste water 209 supplied to the high pressure inlet 104.

A high pressure outlet 106 located on the pressure exchange device 10a is in fluid communication with a separate boost pump 214. The pressure energy of the waste water 209 from the high pressure outlet 106 is supplied to the separate boost pump 214 for example at approximately 960 psi and the boost pump 214 raises the pressure to the high pressure pump discharge pressure and supplies the unfiltered salt water to the filter element 208 for filtration. Thus, a closed loop system is provided that maximizes the use of the waste water and reuses the high pressure of the waste water to increase system efficiency.

However, the use of a separate boost pump in accordance with the prior art has proven problematic and costly. A separate pump reduces overall system reliability and also increases operating and fabrication costs.

There therefore is a need for a pressure exchanger which provides for an integral boost pump feature.

SUMMARY OF THE INVENTION

In accordance with a general aspect of the present invention a pressure exchange device for the transfer of a fluid is provided comprising a high pressure boost unit which is comprised of a high pressure conduit in fluid communication with an impeller. The impeller is configured to raise the pressure of a fluid received through a high pressure inlet port. A low pressure conduit disposed on the high pressure boost unit is in fluid communication with a low pressure fluid source. A pressure exchange unit is further provided which comprises a spinning rotor having a first and second conduit running therethrough, wherein the first and second conduit intermittently align with the high pressure conduit and the low pressure conduit as the rotor spins. A shaft running coaxially through the pressure exchange device is provided with the shaft being further connected to the rotor and the impeller. A motive force is attached to the shaft to provide the energy to spin the rotor and the impeller.

In accordance with another general aspect of the present invention, a system for the filtration of contaminated water to produce potable water is provided which comprises a low pressure pump configured to pump the contaminated water to a high pressure pump. A high pressure pump configured to receive contaminated water from the low pressure pump and communicate the contaminated water to a filtration device at an elevated pressure is also provided. The filtration device is configured to produce potable water and waste water, with the waste water being expelled at a relatively elevated pressure. A pressure exchange device configured to receive the waste water from the filtration device and contaminated water from the low pressure pump is also provided. The pressure exchange pump further is further comprised of a high pressure boost unit which has a high pressure conduit in fluid communication with an impeller, with the impeller being configured to raise the pressure of a fluid received through a high pressure inlet port. A low pressure conduit is in fluid communication with a low pressure fluid source. A pressure exchange unit is also provided which comprises a spinning rotor having a first and second conduit running therethrough wherein the first and second conduit intermittently align with the high pressure conduit and the low pressure conduit as the rotor spins. A shaft running coaxially through the pressure exchange device is provided, with the shaft being further connected to the rotor and the impeller. A motive force attached to the shaft to provide the power required to spin the rotor and the impeller.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
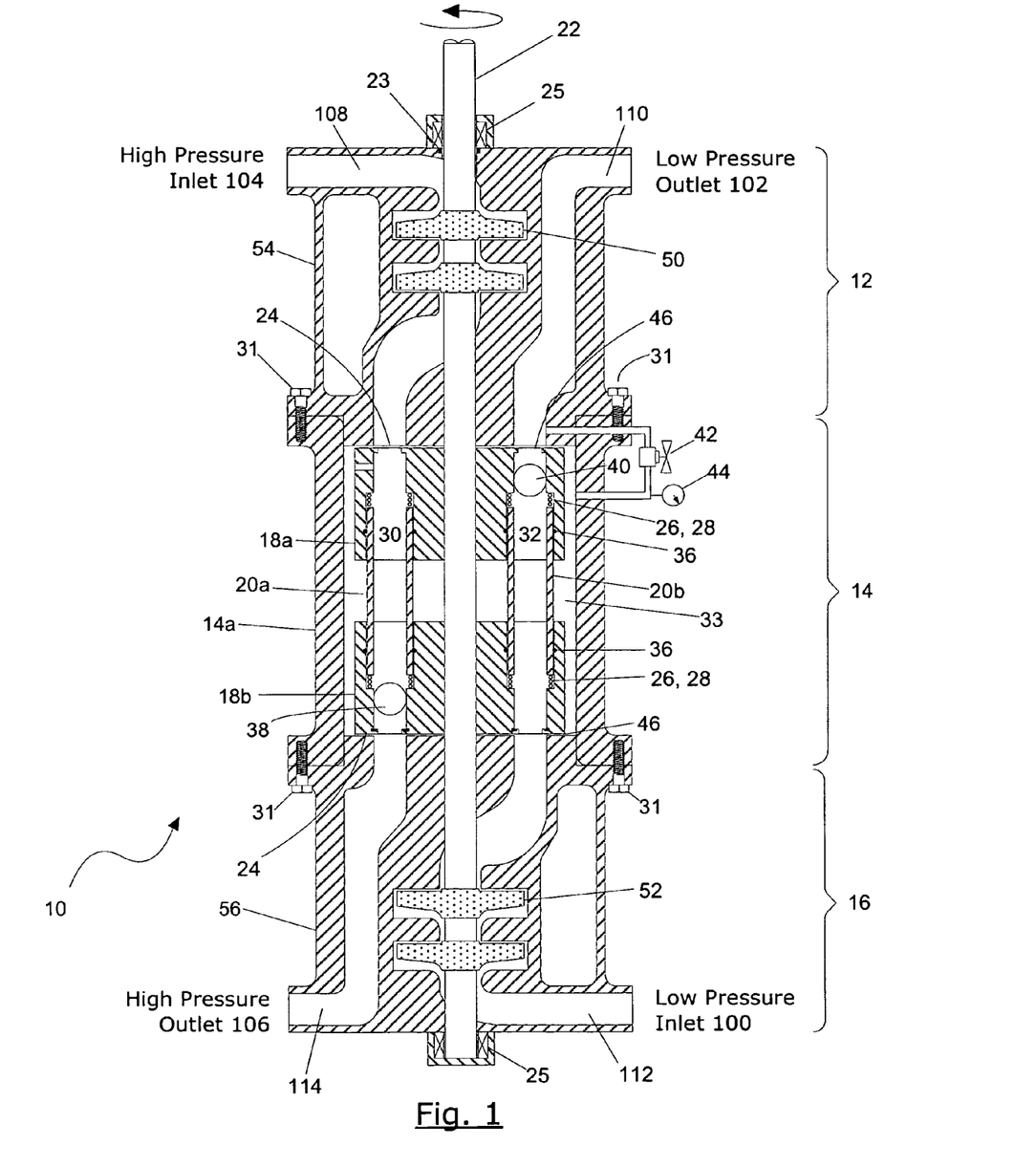
FIG. 1 is a cross-sectional side view of the pressure exchange device with an integral inlet and outlet boost pump.

Referring to FIG. 1, which depicts a simplified cross-sectional view of a pressure exchange device 10 with an integral inlet and outlet boost pump in accordance with the present invention.

The pressure exchange device 10 comprises three main sections, a high pressure boost pump unit 12, a pressure exchange unit 14 and a low pressure boost pump 16. A single shaft 22 runs coaxially through all three sections and is attached to a motive force such as a motor (not shown). The shaft 22 is connected to various spinning parts which will be described in detail later.

The high pressure boost pump 12 comprises a housing 54 having a high pressure inlet port 104 disposed thereon configured to receive high pressure water. A conduit 108 transfers fluid from the inlet port 104 to a series of high pressure impellers 50 that are coaxially mounted on shaft 22. The impellers 50 are configured to boost the pressure of the high pressure water. In the present invention, one or two coaxially aligned impellers are considered sufficient enough to boost the pressure to the desired level. After the fluid passes through the impellers 50, it is transferred to a high pressure conduit 30.

Also located on the high pressure boost pump unit 12 is a low pressure outlet 102. A conduit 110 is in fluid communication with the low pressure outlet 102 and is configured to receive low pressure fluid from a low pressure conduit 32.

The pressure exchange unit 14 comprises a left rotor 18a and a right rotor 18b rotatably mounted inside the housing 14a. Each rotor has at a minimum two opposing conduits denoted 30 and 32. For ease of illustration in this sectional drawing these shall be referred to as a high pressure conduit 30 and a low pressure conduit 32. These conduits are held in coaxial relationship to the shaft 22. A top tube 20a and a bottom tube 20b is sealingly inserted in a respective conduit between the left and right rotor 18b and 18a to bridge the gap between the rotors and thereby provide for a continuous passageway from the right rotor 18a through the left rotor 18b. A seal 36 is provided at each end of the top and bottom tubes 20a and 20b to reduce fluid leakage. With this configuration, when the rotors 18a and 18b are in proper alignment with the respective ports of the high pressure boost pump 12 and the low pressure boost pump 16, fluid may flow through the pressure exchange device 10. It should be understood that it may be beneficial to have a plurality of conduits formed in the rotors 18a and 18b in order to increase the overall output of the pressure exchange unit 14 and increase overall system efficiency.

A spring element 28 is disposed in a step 26 which is formed in the left and right rotor 18a and 18b. The spring element 28 is configured to act against the top and bottom of tubes 20a and 20b and thereby provide a preload force to separate the left and right rotors 18b and 18a to minimize the gap 24 between a sealing surface 46 and the rotors. It should be noted that the gap 24 as shown in FIG. 1 is exaggerated for illustration purposes. Thanks in part to the spring element 28, the gap is actually very small, thereby reducing leakage during the initial start up phase. The sealing surface 46 is a hard coated surface provided on the inside wall of the housing 14a to reduce leakage and wear that may occur from the rotors as they spin. The spring elements 28 therefore provide a preload between the sealing surfaces primarily to reduce leakage at the initial start up of the pressure exchange device 10.

It should be understood that the location and configuration of the spring elements 28 may easily be modified as to location and type. For example, a single spring may be inserted between the left and right rotors 18a and 18b to provide the necessary sealing preload. All such modifications are fully contemplated by the present invention.

As mentioned previously, the shaft 22 runs coaxially through both the left and right rotor 18a and 18b. The shaft 22 is configured to provide the force to spin the rotors, but also allows for the left and right rotor to move along the longitudinal axis of the shaft 22 to maintain a proper sealing interface. This configuration may easily be accomplished by providing a spline or a keyway on the shaft 22 that allows the rotors to slide. A set of bearings 25 are provided to support the shaft 22 and increase the overall system efficiency. A shaft seal 23 may be provided to reduce fluid leakage.

An optional first separator 38 and second separator 40 may be disposed in the respective conduits 30 and 32. The separators 38 and 40 may be a sphere which is configured to translate back and forth in the respective conduit to aid in the pressure exchange process. The separators 38 and 40 may also be pistons with sealing elements disposed thereon.

A pressurized fluid 33 is provided internal to the housing 14a which acts to further separate the left and right rotor 18b and 18a and increase the sealing force acting on the sealing surface 46 and a respective face of the left and right rotors. The net sealing force is proportional to the difference in the pressurized fluid 33 acting to further separate left and right rotor 18b and 18a and the average force trying to close the left and right rotor 18b and 18a. Since the entire face of the rotor is subject to the pressurize fluid 33 while the sealing face 24 is subject to pressures that average lower than this pressure, there is a net force of separation of the rotors. This force is proportional to the difference in pressure between the pressurized fluid 33 pressure and the average face pressure 24. The pressurized fluid 33 may be supplied from the working fluid such as the salt water which is to be filtered, or it may be supplied by a unique fluid source such as a pressurized fluid reservoir.

It may be advantageous to provide a bleed passage 42 which is in fluid communication with the pressurized fluid 33 and the conduit 110 to further regulate the pressure of the pressurized fluid 33. A pressure gage 44 may be located on the housing 14a which is configured to measure and indicate the pressure of the pressurized fluid 33. It would therefore be possible, through the use of dynamically controlled valves and pressure transducers, to provide a regulation system that produces a pressurized fluid that exhibits the optimum sealing force thus maintaining the pressure exchanger at peak efficiency.

The low pressure boost pump unit 16 is comprised of a housing 56 having a low pressure inlet port 100 and a high pressure outlet port 106. The low pressure inlet port 100 is configured to receive low pressure water and transfer it to conduit 112. Conduit 112 transfers the fluid to a series of impellers 52 located in the pump unit 16. Similar to impellers 50, the impellers 52 are coaxially mounted on shaft 22 and are configured to raise the fluid pressure a predetermined amount prior to transferring the fluid to the low pressure conduit 32. A high pressure outlet port 106 receives fluid from conduit 114.

The primary function of the low pressure pump unit 16 is to overcome losses in pumping through the pressure exchanger unit 14 to drain. This allows the reservoir pump 202 to be sized smaller.

A plurality of bolts 31 are provided to attach the three units 12, 14, and 16 together to form a single, unitary device with the shaft 22 running coaxially therein.

Figure 2:
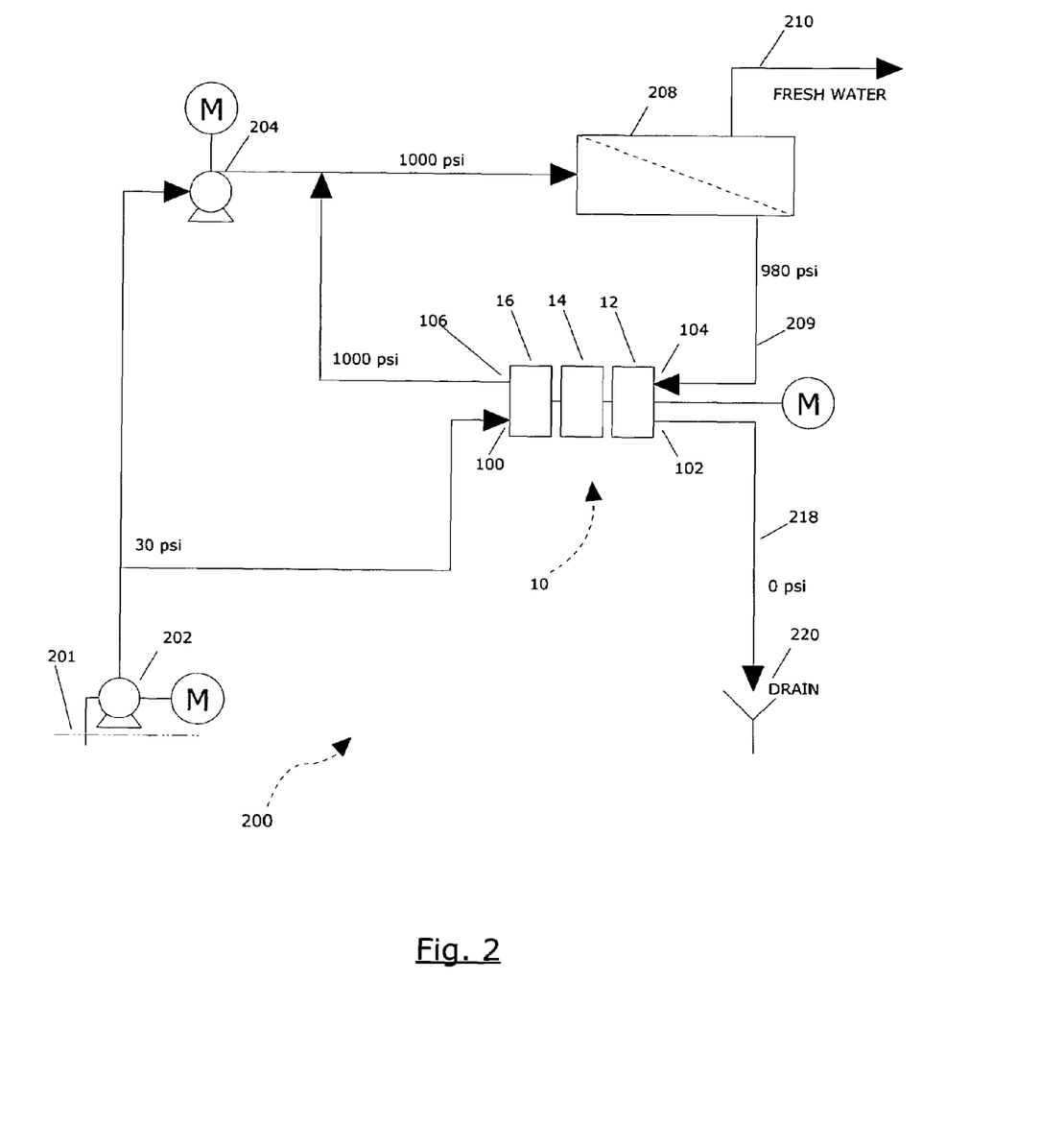
FIG. 2 is a simplified block diagram of an exemplificative filtration system utilizing the pressure exchange device in accordance with the present invention.

Referring now to FIG. 2, which depicts a flow diagram of an unfiltered salt water filtration system 200 in accordance with the present invention. An unfiltered salt water reservoir 201 provides a supply of unfiltered salt water which is pumped to a high pressure pump 204 by reservoir pump 202. Typically the reservoir pump 202 supplies unfiltered salt water to both the high pressure pump 202 and the pressure exchange device 10 at approximately 30 psi pressure at approximately equal flow rates. The high pressure pump 204 boosts the pressure to approximately 1000 psi and supplies the unfiltered salt water to a filter element 208. In this particular application, and not by way of limitation, the filter element 208 comprises a reverse osmosis type filter device which removes the impurities from the water and provides a fresh water supply 210. A pressure drop occurs in the filter element 208 such that a supply of waste water 209 exits the filter element 208 at approximately 980 psi. Rather than dump this waste water 209 at this elevated pressure, the waste water 209 is supplied to a high pressure inlet 104 of the high pressure boost pump unit 12. The boost pump unit 12 then operates to elevate the waste water pressure to approximately 1000 psi and then transfers the high pressure fluid to the pressure exchange unit 14 and out the high pressure outlet 106 disposed on the low pressure boost pump unit 16. This high pressure waste water is thus used to pressurize additional unfiltered salt water for use in the filtration process. Reuse of the pressure energy contained in the high pressure waste water 209 thus provides for a highly efficient filtration system 200. As compared to the prior art system shown in FIG. 3, a single motor has been employed to both boost the waste water pressure 209 and power the pressure exchange device.

As mentioned previously, the reservoir pump 202 supplies unfiltered salt water to a low pressure inlet 100 of the pressure exchange device 10. More specifically, the reservoir pump 202 supplies low pressure unfiltered salt water to inlet 100 located on low pressure boost unit 16. This supply of low pressure unfiltered salt water is transferred to impellers 52 (FIG. 1) which are configured to raise the pressure of the low pressure unfiltered salt water before it is transferred to the pressure exchange unit 14. The pressure exchange unit 14, as to be discussed in more detail below, is configured to raise the pressure of the unfiltered salt water supplied to it by the reservoir pump 202 to a pressure equal to the discharge pressure of pump 204.

The high pressure outlet 106 located on the low pressure boost pump unit 16 is in fluid communication with an inlet to the filter element 208 for further filtration. Thus, a closed loop system is provided that maximizes the use of the waste water pressure energy in conduit 209.

Referring to FIGS. 1 and 2, and as previously described, the pressure exchange device 10 operates to transfer the high pressure contained in the waste water 209 (approx. 980 psi) to the low pressure (approx. 30 psi) unfiltered salt water supplied to the low pressure inlet 100 by the reservoir pump 202. This is accomplished by spinning the left and right rotors 18a and 18b in unison such that the low pressure conduit 32 and the high pressure conduit 30 intermittently align with a respective inlet and outlet port disposed in the high pressure boost unit 12 and low pressure boost unit 16. A plurality of bores through the rotor is desirable in order to even out the flow through the pressure exchanger and increase throughput.

For example, with the rotors 18a and 18b in the position shown in FIG. 1, high pressure waste water is allowed to flow into the high pressure conduit 30 through the high pressure inlet 104 and conduit 108. This high pressure flow forces separator 38 to push unfiltered salt water that is already contained in the high pressure conduit 30 (from the previous cycle) out the high pressure outlet 106 at the elevated pressure. Thus the low pressure fluid contained in the conduit 30 has now been elevated to the high pressure. At the same time, the low pressure conduit 32 is in alignment with the low pressure inlet 100 and receives low pressure salt water from the reservoir pump 202. Since the low pressure outlet, as shown in FIG. 2 is attached to a drain (ie atmosphere), the flow of the low pressure fluid forces the separator 40 to the right and forces the fluid out of the low pressure conduit 32 through the low pressure outlet 102 to a drain 220. It should be noted that the low pressure fluid that just flowed into the conduit 32, will be the fluid that is pressurized to the higher pressure when the rotors spin 180 degrees and aligns with the conduit 108, thereby repeating the pressure transfer all over again. As mentioned previously, a plurality of conduits, of varying cross-sectional shapes and sizes, can be formed in the rotors 18a and 18b to increase the flow rate and even out the flow of fluid through the pressure exchange device 10.

Figure 4:
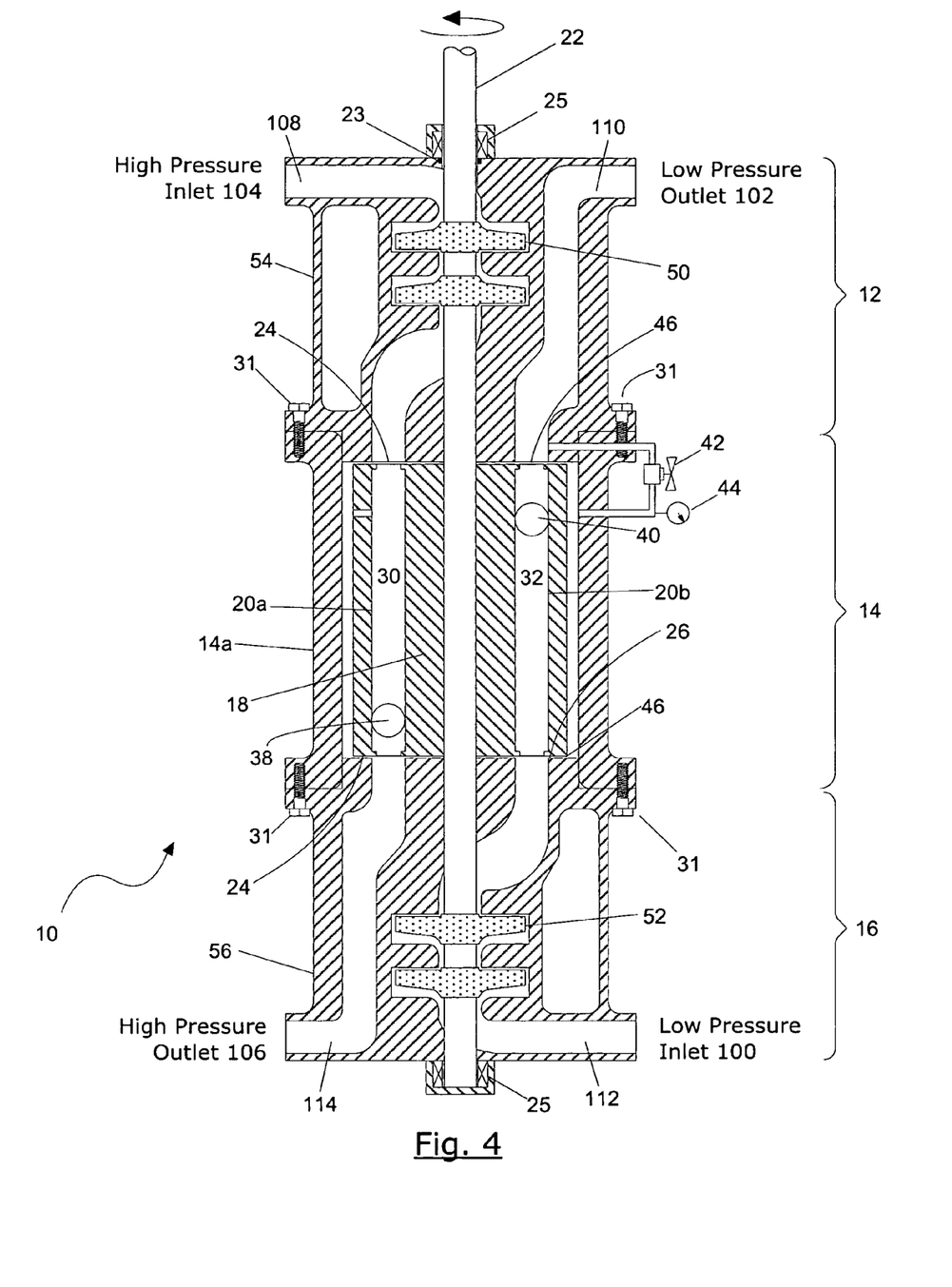
FIG. 4 is a cross-sectional view of another exemplificative pressure exchange device having an integral inlet and outlet boost pump.

Referring now to FIG. 4, (where like numerals depict like features) a pressure exchange device 10a with a single rotor 18 is disposed in the pressure exchange unit 14. Operation and construction of pressure exchange device 10a is exactly the same as the device described in FIG. 1 with the sole difference being the removal of the split rotors 18a and 18b. This single rotor version is easier and less expensive to fabricate, but it may not provide for the enhanced sealing and reduced wear features as the device depicted in FIG. 1.

It should be noted that the diameter of the impellers 50 and/or 52 may be modified to provide optimal fluid flow to the rotors. This feature allows the design of the integral pumps to be specifically adapted to the intended use of the system. It should also be mentioned that the speed of the system may be increased or decreased to alter the volume of fluid that is processed. This may be accomplished by attaching a variable speed motor to the driving shaft.

It should be understood, of course, that the foregoing relates to exemplective embodiments of the invention and that modifications may be made without departing from the spirit and scope of the invention as set forth in the following claims. For example, the fluid pressures discussed herein were used for illustration purposes only and should not be used to limit the appended claims. In addition, the invention can operate with both high pressure and low pressure pumping units or either the high pressure or low pressure pumping unit. It is also possible to interchange the placement of the high and low pressure ports. The high and low pressure ports are defined only be the person connecting the piping. In this arrangement, it would also be necessary to move the bleed piping port 42 and gage 44 as previously described so that these are connected to the low pressure conduit. Otherwise, there is no inherent mechanical difference.

I claim:

1. A pressure exchange device for the transfer of a fluid comprising:
    a high pressure boost unit comprising;
        a high pressure conduit in fluid communication with an impeller, said impeller configured to raise the pressure of a fluid received through a high pressure inlet port;
        a low pressure conduit in fluid communication with a low pressure fluid source;
    a pressure exchange unit comprising;
        a spinning rotor having a first and second conduit running therethrough;
        wherein said first and second conduit intermittently and opposingly align with said high pressure conduit and said low pressure conduit as said rotor spins;
    a shaft running coaxially through said pressure exchange device, said shaft being further connected to said rotor and said impeller;
    a motive force attached to said shaft;
    wherein said pressure exchange unit further comprises
    a housing having a low pressure inlet located at a first distal end of said housing and a low pressure outlet located a second distal end of said housing, wherein said low pressure outlet is in alignment with said low pressure inlet, said housing further comprising a high pressure inlet located at said second distal end of said housing and a high pressure outlet located at said first distal end of said housing, wherein said high pressure inlet is in alignment with said high pressure outlet;
    a left rotor rotatably mounted inside said housing, said left rotor having a first low pressure conduit and a first high pressure conduit therethrough, said conduits configured to align with said high pressure outlet and said low pressure inlet in succession as said left rotor rotates;
    a right rotor, coaxially aligned and offset from said left rotor, rotatably mounted inside said housing, said right rotor having a second low pressure conduit and a second high pressure conduit therethrough, said conduits being configured to align with said high pressure inlet and said low pressure outlet in succession as said right rotor rotates;
    a first tube sealing placed intermediate said left rotor and said right rotor configured to communicate fluid between said first low pressure conduit and said second low pressure conduit;
    a second tube, sealingly placed intermediate said left rotor and said right rotor configured to communicate fluid between said first high pressure conduit and said second high pressure conduit;
    a spring disposed between said left rotor and said right rotor, said spring configured to bias said left and right rotor apart from each other thereby maintain light contact with a said housing;
    a pressurized fluid internal to said housing, said pressurized fluid acting to maintain sealing contact between said left rotor and said right rotor and a respective sealing surface of said housing.

2. The pressure exchange unit of claim 1, further comprising an orifice configured to communicate fluid between said first and second high pressure conduit to said pressurized fluid.

3. The pressure exchange device of claim 1, further comprising:
    a low pressure boost pump unit having a low pressure inlet and a high pressure outlet, wherein said low pressure inlet is in fluid communication with a low pressure conduit which is configured to supply fluid to a second impeller, said second impeller being mounted on said shaft, said second impeller configured to raise the pressure of fluid received from said low pressure conduit;
    wherein said fluid is transferred from said low pressure conduit to a second low pressure conduit disposed in said pressure exchange unit.

4. The pressure exchange device of claim 1, further comprising a valve configured to maintain a predetermined pressure of said pressurized fluid.

5. The pressure exchange device of claim 4, wherein said valve is dynamically controlled to dynamically control the sealing contact.

6. The pressure exchange device of claim 1, wherein said motive force is one selected from the group consisting of an electric motor, a diesel engine, a turbine, and a gas engine.

7. The pressure exchange device of claim 1, further comprising:
  a first separator movable inside said first conduit; and,
  a second separator movable inside said second conduit.

8. A system for the filtration of contaminated water to produce potable water comprising:
  a low pressure pump configured to pump the contaminated water to a high pressure pump;
  a high pressure pump configured to receive contaminated water from said low pressure pump and communicate the contaminated water to a filtration device at an elevated pressure;
  said filtration device configured to produce filtered water and waste water, said waste water being expelled at a relatively elevated pressure;
  a pressure exchange device configured to receive said waste water from said filtration device and contaminated water from said low pressure pump, said pressure exchange pump further comprising;
  a high pressure boost unit comprising;
    a high pressure conduit in fluid communication with an impeller, said impeller configured to raise the pressure of a fluid received through a high pressure inlet port;
    a low pressure conduit in fluid communication with a low pressure fluid source;
  a pressure exchange unit comprising;
    a spinning rotor having a first and second conduit running therethrough;
    wherein said first and second conduit intermittently align with said high pressure conduit and said low pressure conduit as said rotor spins;
    a shaft running coaxially through said pressure exchange device, said shaft being further connected to said rotor and said impeller;
  a motive force attached to said shaft;
  wherein said pressure exchange a unit further comprises;
    a housing having a low pressure inlet located at a first distal end of said housing and a low pressure outlet located a second distal end of said housing, wherein said low pressure outlet is in alignment with said low pressure inlet, said housing further comprising a high pressure inlet located at said second distal end of said housing and a high pressure outlet located at said first distal end of said housing, wherein said high pressure inlet is in alignment with said high pressure outlet;
    a left rotor rotatably mounted inside said housing, said left rotor having a first low pressure conduits and a first high pressure conduit therethrough, said conduits configured to align with said high pressure outlet and said low pressure inlet in succession as said left rotor rotates;
    a right rotor, coaxially aligned and offset from said left rotor, rotatably mounted inside said housing, said right rotor having a second low pressure conduit and a second high pressure conduit therethrough, said conduits being configured to align with said high pressure inlet and said low pressure outlet in succession as said right rotor rotates;
    a first tube sealingly placed intermediate said left rotor and said right rotor configured to communicate fluid between said first low pressure conduit and said second low pressure conduit;
    a second tube sealingly placed intermediate said left rotor and said right rotor configured to communicate fluid between said first high pressure conduit and said second high pressure conduit;
    a spring disposed between said left rotor and said right rotor, said spring configured to bias said left and right rotor apart from each other thereby maintaining light contact with said housing;
    a pressurized fluid internal to said housing, said pressurized fluid acting to maintain sealing contact between said left rotor and said right rotor and a respective sealing surface of said housing.

9. The filtration system of claim 8, wherein said motive force is one selected from the group consisting of an electric motor, a diesel engine, a turbine, a gas engine and a wind turbine.

10. The filtration system of claim 8, further comprising:
  a low pressure boost pump unit having a low pressure inlet and a high pressure outlet, wherein said low pressure inlet is in fluid communication with low pressure conduit which is configured to supply fluid to a second impeller, said second impeller being mounted on said shaft, said second impeller configured to raise the pressure of fluid received from said low pressure conduit;
  wherein said fluid is transferred from said low pressure conduit to a second low pressure conduit disposed n said pressure exchange unit.

11. A pressure exchange apparatus for transferring the energy of pressurization between two fluids, wherein one fluid is at a relatively higher pressure than the other, comprising:
  a high pressure boost unit comprising;
    a high pressure conduit in fluid communication with an impeller, said impeller configured to raise the pressure of a fluid received through a high pressure inlet port;
    a low pressure conduit in fluid communication with a low pressure fluid source;
  a pressure exchange unit comprising;
    a housing containing a spinning left and right rotor having a first and second conduit running there between;
    wherein said first and second conduit intermittently align with said high pressure conduit and said low pressure conduit as said left and right rotors spins;
    a wring disposed between said left rotor and said right rotor, said spring configured to bias said left and right rotor apart from each other thereby maintaining light contact with said housing;
    a pressurized fluid internal to said housing, said pressurized fluid acting to maintain sealing contact between said left rotor and said right rotor and a respective sealing surface of said housing:
  a shaft running coaxially through said pressure exchange device, said shaft being further connected to said rotor and said impeller;
  a motive force attached to said shaft.

12. The pressure exchange apparatus of claim 11 further comprising:
  a low pressure boost pump unit having a low pressure inlet and a high pressure outlet, wherein said low pressure inlet is in fluid communication with low pressure conduit which is configured to supply fluid to a second impeller, said second impeller being mounted on said shaft, said second impeller configured to raise the pressure of fluid received from said low pressure conduit;

wherein said fluid is transferred from said low pressure conduit to a second low pressure conduit disposed in said pressure exchange unit.

13. The pressure exchange apparatus of claim 11 wherein the diameter of said impeller is modifiable to provide an optimal fluid flow.

14. The pressure exchange apparatus of claim 11 wherein said motive force is variable to alter the speed of rotation of said shaft thereby altering the volumetric flow of fluid through the pressure exchange apparatus.

15. The pressure exchange apparatus of claim 11 wherein said motive force is one selected from the group consisting of a variable speed DC motor, a variable speed AC motor, and a motor connected to a variable speed transmission.

* * * * *